US010581923B2

(12) United States Patent
Gnessin et al.

(10) Patent No.: US 10,581,923 B2
(45) Date of Patent: Mar. 3, 2020

(54) SYSTEM AND METHOD FOR CONFIGURATION OF A CONNECTED DEVICE CONNECTION

(71) Applicant: Cloud of Things Ltd., Tel Aviv (IL)

(72) Inventors: Eliav Gnessin, Givat Brenner (IL); David Ariel Chouraqui, Tel Aviv (IL)

(73) Assignee: CLOUD OF THINGS LTD, Tel Aviv (IL)

( * ) Notice: Subject to any disclaimer, the term of this patent is extended or adjusted under 35 U.S.C. 154(b) by 0 days.

(21) Appl. No.: 16/330,089

(22) PCT Filed: Sep. 5, 2017

(86) PCT No.: PCT/IL2017/050993
§ 371 (c)(1),
(2) Date: Mar. 3, 2019

(87) PCT Pub. No.: WO2018/047167
PCT Pub. Date: Mar. 15, 2018

(65) Prior Publication Data
US 2019/0253458 A1    Aug. 15, 2019

Related U.S. Application Data

(60) Provisional application No. 62/384,343, filed on Sep. 7, 2016.

(51) Int. Cl.
*H04L 29/06* (2006.01)
*H04L 29/08* (2006.01)
*H04L 9/32* (2006.01)

(52) U.S. Cl.
CPC ............ *H04L 63/20* (2013.01); *H04L 9/32* (2013.01); *H04L 63/062* (2013.01); *H04L 63/08* (2013.01);
(Continued)

(58) Field of Classification Search
CPC . H04L 63/08; H04L 63/20; H04L 9/32; H04L 67/1097; H04L 67/146; H04L 67/18; G06F 21/44
See application file for complete search history.

(56) References Cited

U.S. PATENT DOCUMENTS 6,671,276 B1 *  12/2003  Bakre ................. H04L 12/1836
                                                          370/390
8,473,620 B2    6/2013   Demmer et al.
(Continued)

FOREIGN PATENT DOCUMENTS

WO        2014049389        4/2014

OTHER PUBLICATIONS

Focus Group on Cloud Computing Technical Report, Part 5: Cloud Security. International Telecommunication Union, Telecommunication Standardization Sector, Feb. 2012, pp. 13 & 17-32, URL: < https://www.itu.int/dms_pub/itu-t/opb/fg/T-FG-CLOUD-2012-P5-PDF-E.pdf>.

*Primary Examiner* — Hosuk Song
(74) *Attorney, Agent, or Firm* — S.J. Intellectual Property Ltd.

(57) ABSTRACT

A method for connecting a connected device to a secure network of interconnected computers, the method comprising: sending, by a processing unit of the connected device, to a cloud switch server, an activation request comprising first identification information enabling identification of the connected device; receiving, by the processing unit, from the cloud switch server, connection information enabling connecting the connected device to the secure network of interconnected computers; and establishing, by the processing unit, a connection between the connected device and the secure network of interconnected computers, utilizing the connection information.

17 Claims, 4 Drawing Sheets

(52) U.S. Cl.
CPC .......... *H04L 67/10* (2013.01); *H04L 67/1097* (2013.01); *H04L 67/146* (2013.01); *H04L 67/148* (2013.01); *H04L 67/18* (2013.01)

(56) References Cited

U.S. PATENT DOCUMENTS

| | | | |
|---|---|---|---|
| 9,712,435 B2 * | 7/2017 | Teng | H04L 45/50 |
| 9,800,517 B1 * | 10/2017 | Anderson | H04L 47/70 |
| 9,886,267 B2 * | 2/2018 | Maheshwari | H04L 47/70 |
| 10,158,536 B2 * | 12/2018 | Kim | H04L 12/2807 |
| 2013/0060838 A1 | 3/2013 | Yaffe | |
| 2013/0085989 A1 | 4/2013 | Nayyar | |
| 2015/0012763 A1 | 1/2015 | Cohen et al. | |
| 2015/0172321 A1 | 6/2015 | Kirti et al. | |
| 2018/0013798 A1 * | 1/2018 | Pallas | H04L 63/205 |

* cited by examiner

SYSTEM AND METHOD FOR CONFIGURATION OF A CONNECTED DEVICE CONNECTION

TECHNICAL FIELD

The invention relates to a system and method for configuration of a connected device connection.

BACKGROUND

Many devices (including, for example, home appliances, cars, electronic signs, and many more) are designed nowadays to connect to the Internet. Such devices are referred to herein as: "connected devices". Many of the connected devices are pre-configured to automatically connect to a given pre-defined network of interconnected computers, inter alia for storing and/or analyzing various information obtained by the connected device and sent to such given network for this purpose. However, the connected devices are limited to communicate with the given pre-defined network, operated by a given vendor/service provider (e.g. Amazon, IBM, Oracle, etc.). Seamless configuration of the connected devices to connect to another network of interconnected computers is impossible. Therefore, the connected devices depend on the availability of the given pre-defined network. In addition, each network of interconnected computers to which the connected devices can connect has different characteristics, both static and dynamic. Some examples for such characteristics include a security level, a cost (that can optionally depend on the amount of data sent to the network by a connected device—the more data is sent—the higher the cost), a communication latency, a given Service Level Agreement (SLA), and more. Matching between the requirements of a given connected device or a group of connected devices and between the characteristics of each network of interconnected computers to which such connected device/s can connect is desirable, whereas locking the connected device/s to connect to a given pre-defined network of interconnected computers has various disadvantages.

There is thus a need in the art for a new method and system for configuration of a connected device connection.

GENERAL DESCRIPTION

In accordance with a first aspect of the presently disclosed subject matter, there is provided a method for connecting a connected device to a secure network of interconnected computers, the method comprising: (i) sending, by a processing resource of the connected device, to a cloud switch server, an activation request comprising first identification information enabling identification of the connected device; (ii) receiving, by the processing resource, from the cloud switch server, connection information enabling connecting the connected device to the secure network of interconnected computers, the connection information comprising (a) second identification information enabling identification of the secure network of interconnected computers, (b) a cloud device identifier generated by the secure network of interconnected computers and enabling the secure network of interconnected computers to identify the connected device; and (c) unique security credentials enabling only the connected device to connect to the secure network of interconnected computers and to access at least parts thereof; and (iii) establishing, by the processing resource, a connection between the connected device and the secure network of interconnected computers, utilizing the connection information, wherein the unique security credentials are required for establishing the connection.

In some cases, the method further comprises, upon disconnection of the connection, repeating steps (i)-(iii) wherein the unique security credentials received at step (ii) are different than previously received unique security credentials previously used for establishing the connection.

In some cases, the unique security credentials are temporary credentials enabling maintaining the connection for a limited period of time, and wherein the disconnection is caused due to expiry of the unique security credentials.

In some cases, the second identification information received at step (ii) enables identification of a second secure network of interconnected computers; wherein the cloud device identifier received at step (ii) is generated by the second secure network of interconnected computers and enables the second secure network of interconnected computers to identify the connected device; and wherein the connection established at step (iii) is between the connected device and the second secure network of interconnected computers.

In some cases, data stored on the secure network of interconnected computers and relating to the connected device is migrated to the second secure network of interconnected computers.

In some cases, the cloud switch server is not part of the secure network of interconnected computers.

In some cases, the first identification information includes a unique identifier uniquely identifying the connected device.

In some cases, the second identification information includes an Internet Protocol (IP) address or a Uniform Resource Locator (URL) of a given endpoint being part of the secure network of interconnected computers.

In some cases, the unique security credentials are generated by the secure network of interconnected computers.

In some cases, the cloud switch server obtains the cloud device identifier and the unique security credentials from the secure network of interconnected computers.

In some cases, the method further comprises sending, by the processing resource, via the connection, at least one message to the secure network of interconnected computers.

In some cases, the message is sent by the secure network of interconnected computers to the cloud switch server.

In accordance with a second aspect of the presently disclosed subject matter, there is provided a method for switching a connection of a connected device from a first connection to a first secure network of interconnected computers to a second connection to a second secure network of interconnected computers, the method comprising: receiving, by a processing resource of the connected device, from a cloud switch server, a switch instruction for switching the connection of the connected device from the first connection to the first secure network of interconnected computers to the second connection to the second secure network of interconnected computers, the switch instruction including switch information comprising (a) identification information enabling identification of the second secure network of interconnected computers, (b) a cloud device identifier generated by the second secure network of interconnected computers and enabling the second secure network of interconnected computers to identify the connected device; and (c) unique security credentials enabling only the connected device to connect to the second secure network of interconnected computers and to access at least parts thereof; and establishing, by the processing resource, the second connection between the connected device and the second secure network of interconnected computers, utilizing the switch information, wherein the unique security credentials are required for establishing the connection.

In some cases, the switch instruction is received upon one or more criteria being met.

In some cases, the criteria includes one or more of the following: (a) one or more performance measures of the first secure network of interconnected computers do not meet a corresponding threshold; (b) one or more security requirements are not met by the first secure network of interconnected computers; (c) a first cost of the first connection is higher than a second cost of the second connection; (d) a current time of day is within a predetermined range; and (e) a current geographical location of the connected device is within a predetermined geographical area.

In some cases, the switch instruction is received via the first connection.

In some cases, the cloud switch server is not part of the first secure network of interconnected computers and of the second secure network of interconnected computers.

In some cases, the method further comprises disconnecting the first connection after the second connection is established.

In some cases, past data associated with the connected device and stored on the first secure network of interconnected computers is migrated to the second secure network of interconnected computers after the second connection is established.

In accordance with a third aspect of the presently disclosed subject matter, there is provided a method for connecting a connected device to a secure network of interconnected computers, the method comprising: receiving, by a processing resource of a cloud switch server, from the connected device, an activation request comprising first identification information enabling identification of the connected device; obtaining (a) a cloud device identifier generated by the secure network of interconnected computers and enabling the secure network of interconnected computers to identify the connected device, and (b) unique security credentials enabling only the connected device to connect to the secure network of interconnected computers and to access at least parts thereof; and sending, by the processing resource, to the connected device, connection information enabling connecting the connected device to the secure network of interconnected computers, the connection information comprising (a) second identification information enabling identification of the secure network of interconnected computers, (b) the cloud device identifier; and (c) the unique security credentials.

In some cases, the unique security credentials are temporary credentials enabling maintaining a connection between the connected device and the secure network of interconnected computers for a limited period of time.

In some cases, the method further comprises receiving, from the secure network of interconnected computers, at least one message sent by the connected device to the secure network of interconnected computers.

In some cases, the method further comprises sending at least one message to the connected device via the secure network of interconnected computers, utilizing the cloud device identifier.

In accordance with a fourth aspect of the presently disclosed subject matter, there is provided a method for switching a connection of a connected device from a first connection to a first secure network of interconnected computers to a second connection to a second secure network of interconnected computers, the method comprising: obtaining, by a processing resource of a cloud switch server, (a) a cloud device identifier generated by the second secure network of interconnected computers and enabling the second secure network of interconnected computers to identify the connected device, and (b) unique security credentials enabling only the connected device to connect to the second secure network of interconnected computers and to access at least parts thereof; and sending, by the processing resource, to the connected device, connection information enabling connecting the connected device to the second secure network of interconnected computers, the connection information comprising (a) second identification information enabling identification of the second secure network of interconnected computers, (b) the cloud device identifier; and (c) the unique security credentials.

In some cases, the obtaining and sending are performed after receiving, by the processing resource of the cloud switch server, from a user, a switch instruction for switching the connection of the connected device from the first connection to the first secure network of interconnected computers to the second connection to the second secure network of interconnected computers.

In some cases, the obtaining and sending are performed upon one or more criteria being met.

In some cases, the criteria includes one or more of the following: (a) one or more performance measures of the first secure network of interconnected computers do not meet a corresponding threshold; (b) one or more security requirements are not met by the first secure network of interconnected computers; (c) a first cost of the first connection is higher than a second cost of the second connection; (d) a current time of day is within a predetermined range; and (e) a current geographical location of the connected device is within a predetermined geographical area.

In some cases, the method further comprises receiving, by the cloud switch server, from the second secure network of interconnected computers, at least one message sent by the connected device to the second secure network of interconnected computers.

In some cases, the method further comprises sending, by the cloud switch server, at least one message to the connected device via the second secure network of interconnected computers, utilizing the cloud device identifier.

In some cases, the cloud switch server is not part of the first secure network of interconnected computers and of the second secure network of interconnected computers.

In some cases, the first connection is disconnected after the second connection is established.

In some cases, the method further comprises migrating past data associated with the connected device and stored on the first secure network of interconnected computers to the second secure network of interconnected computers after the second connection is established.

In accordance with a fifth aspect of the presently disclosed subject matter, there is provided a connected device comprising a processing resource, the processing resource configured to: (i) send, to a cloud switch server, an activation request comprising first identification information enabling identification of the connected device; (ii) receive, from the cloud switch server, connection information enabling connecting the connected device to a secure network of interconnected computers, the connection information comprising (a) second identification information enabling identification of the secure network of interconnected computers, (b) a cloud device identifier generated by the secure network of interconnected computers and enabling the secure network of interconnected computers to identify the connected device; and (c) unique security credentials enabling only the connected device to connect to the secure network of interconnected computers and to access at least parts thereof; and (iii) establish a connection between the connected device and the secure network of interconnected computers, utilizing the connection information, wherein the unique security credentials are required for establishing the connection.

In some cases, the processing resource is further configured, upon disconnection of the connection, to repeat steps (i)-(iii) wherein the unique security credentials received at step (ii) are different than previously received unique security credentials previously used for establishing the connection.

In some cases, the unique security credentials are temporary credentials enabling maintaining the connection for a limited period of time, and wherein the disconnection is caused due to expiry of the unique security credentials.

In some cases, the second identification information received at step (ii) enables identification of a second secure network of interconnected computers; wherein the cloud device identifier received at step (ii) is generated by the second secure network of interconnected computers and enables the second secure network of interconnected computers to identify the connected device; and wherein the connection established at step (iii) is between the connected device and the second secure network of interconnected computers.

In some cases, data stored on the secure network of interconnected computers and relating to the connected device is migrated to the second secure network of interconnected computers.

In some cases, the cloud switch server is not part of the secure network of interconnected computers.

In some cases, the first identification information includes a unique identifier uniquely identifying the connected device.

In some cases, the second identification information includes an Internet Protocol (IP) address or a Uniform Resource Locator (URL) of a given endpoint being part of the secure network of interconnected computers.

In some cases, the unique security credentials are generated by the secure network of interconnected computers.

In some cases, the cloud switch server obtains the cloud device identifier and the unique security credentials from the secure network of interconnected computers.

In some cases, the processing resource is further configured to send, via the connection, at least one message to the secure network of interconnected computers.

In some cases, the message is sent by the secure network of interconnected computers to the cloud switch server.

In accordance with a sixth aspect of the presently disclosed subject matter, there is provided a connected device comprising a processing resource, the processing resource configured to: receive, from a cloud switch server, a switch instruction for switching a connection of the connected device from a first connection to a first secure network of interconnected computers to a second connection to a second secure network of interconnected computers, the switch instruction including switch information comprising (a) identification information enabling identification of the second secure network of interconnected computers, (b) a cloud device identifier generated by the second secure network of interconnected computers and enabling the second secure network of interconnected computers to identify the connected device; and (c) unique security credentials enabling only the connected device to connect to the second secure network of interconnected computers and to access at least parts thereof; and establish the second connection between the connected device and the second secure network of interconnected computers, utilizing the switch information, wherein the unique security credentials are required for establishing the connection.

In some cases, the switch instruction is received upon one or more criteria being met.

In some cases, the criteria includes one or more of the following: (a) one or more performance measures of the first secure network of interconnected computers do not meet a corresponding threshold; (b) one or more security requirements are not met by the first secure network of interconnected computers; (c) a first cost of the first connection is higher than a second cost of the second connection; (d) a current time of day is within a predetermined range; and (e) a current geographical location of the connected device is within a predetermined geographical area.

In some cases, the switch instruction is received via the first connection.

In some cases, the cloud switch server is not part of the first secure network of interconnected computers and of the second secure network of interconnected computers.

In some cases, the processing resource is further configured to disconnect the first connection after the second connection is established.

In some cases, past data associated with the connected device and stored on the first secure network of interconnected computers is migrated to the second secure network of interconnected computers after the second connection is established.

In accordance with a seventh aspect of the presently disclosed subject matter, there is provided a cloud switch server comprising a processing resource, the processing resource configured to: receive, from a connected device, an activation request comprising first identification information enabling identification of the connected device; obtain (a) a cloud device identifier generated by a secure network of interconnected computers and enabling the secure network of interconnected computers to identify the connected device, and (b) unique security credentials enabling only the connected device to connect to the secure network of interconnected computers and to access at least parts thereof; and send, to the connected device, connection information enabling connecting the connected device to the secure network of interconnected computers, the connection information comprising (a) second identification information enabling identification of the secure network of interconnected computers, (b) the cloud device identifier; and (c) the unique security credentials.

In some cases, the unique security credentials are temporary credentials enabling maintaining a connection between the connected device and the secure network of interconnected computers for a limited period of time.

In some cases, the processing resource is further configured to receive, from the secure network of interconnected computers, at least one message sent by the connected device to the secure network of interconnected computers.

In some cases, the processing resource is further configured to send at least one message to the connected device via the secure network of interconnected computers, utilizing the cloud device identifier.

In accordance with an eighth aspect of the presently disclosed subject matter, there is provided a cloud switch server comprising a processing resource, the processing resource configured to: obtain (a) a cloud device identifier generated by a second secure network of interconnected computers, other than a first secure network of interconnected computers to which a connected device is connected to, and enabling the second secure network of interconnected computers to identify the connected device, and (b) unique security credentials enabling only the connected device to connect to the second secure network of interconnected computers and to access at least parts thereof; and send, by the processing unit, to the connected device, connection information enabling connecting the connected device to the second secure network of interconnected computers, the connection information comprising (a) second identification information enabling identification of the second secure network of interconnected computers, (b) the cloud device identifier; and (c) the unique security credentials.

In some cases, the obtain and send are performed after receiving, by the processing resource, from a user, a switch instruction for switching a connection of the connected device from a first connection to the first secure network of interconnected computers to a second connection to the second secure network of interconnected computers.

In some cases, the obtain and send are performed upon one or more criteria being met.

In some cases, the criteria includes one or more of the following: (a) one or more performance measures of the first secure network of interconnected computers do not meet a corresponding threshold; (b) one or more security requirements are not met by the first secure network of interconnected computers; (c) a first cost of the first connection is higher than a second cost of the second connection; (d) a current time of day is within a predetermined range; and (e) a current geographical location of the connected device is within a predetermined geographical area.

In some cases, the processing resource is further configured to receive, from the second secure network of interconnected computers, at least one message sent by the connected device to the second secure network of interconnected computers.

In some cases, the processing resource is further configured to send at least one message to the connected device via the second secure network of interconnected computers, utilizing the cloud device identifier.

In some cases, the cloud switch server is not part of the first secure network of interconnected computers and of the second secure network of interconnected computers.

In some cases, the first connection is disconnected after the second connection is established.

In some cases, the processing resource is further configured to migrate past data associated with the connected device and stored on the first secure network of interconnected computers to the second secure network of interconnected computers after the second connection is established.

In accordance with a ninth aspect of the presently disclosed subject matter, there is provided a non-transitory computer readable storage medium having computer readable program code embodied therewith, the computer readable program code, executable by at least one processor of a computer to perform a method comprising: (i) sending, by a processing resource of a connected device, to a cloud switch server, an activation request comprising first identification information enabling identification of the connected device; (ii) receiving, by the processing resource, from the cloud switch server, connection information enabling connecting the connected device to a secure network of interconnected computers, the connection information comprising (a) second identification information enabling identification of the secure network of interconnected computers, (b) a cloud device identifier generated by the secure network of interconnected computers and enabling the secure network of interconnected computers to identify the connected device; and (c) unique security credentials enabling only the connected device to connect to the secure network of interconnected computers and to access at least parts thereof; and (iii) establishing, by the processing resource, a connection between the connected device and the secure network of interconnected computers, utilizing the connection information, wherein the unique security credentials are required for establishing the connection.

In accordance with a tenth aspect of the presently disclosed subject matter, there is provided a non-transitory computer readable storage medium having computer readable program code embodied therewith, the computer readable program code, executable by at least one processor of a computer to perform a method comprising: receiving, by a processing resource of a connected device, from a cloud switch server, a switch instruction for switching a connection of the connected device from a first connection to a first secure network of interconnected computers to a second connection to a second secure network of interconnected computers, the switch instruction including switch information comprising (a) identification information enabling identification of the second secure network of interconnected computers, (b) a cloud device identifier generated by the second secure network of interconnected computers and enabling the second secure network of interconnected computers to identify the connected device; and (c) unique security credentials enabling only the connected device to connect to the second secure network of interconnected computers and to access at least parts thereof; and establishing, by the processing resource, the second connection between the connected device and the second secure network of interconnected computers, utilizing the switch information, wherein the unique security credentials are required for establishing the connection.

In accordance with an eleventh aspect of the presently disclosed subject matter, there is provided a non-transitory computer readable storage medium having computer readable program code embodied therewith, the computer readable program code, executable by at least one processor of a computer to perform a method comprising: receiving, by a processing resource of a cloud switch server, from a connected device, an activation request comprising first identification information enabling identification of the connected device; obtaining (a) a cloud device identifier generated by a secure network of interconnected computers and enabling the secure network of interconnected computers to identify the connected device, and (b) unique security credentials enabling only the connected device to connect to the secure network of interconnected computers and to access at least parts thereof; and sending, by the processing resource, to the connected device, connection information enabling connecting the connected device to the secure network of interconnected computers, the connection information comprising (a) second identification information enabling identification of the secure network of interconnected computers, (b) the cloud device identifier; and (c) the unique security credentials.

In accordance with a twelfths aspect of the presently disclosed subject matter, there is provided a non-transitory computer readable storage medium having computer readable program code embodied therewith, the computer readable program code, executable by at least one processor of a computer to perform a method comprising: obtaining, by a processing resource of a cloud switch server, (a) a cloud device identifier generated by a second secure network of interconnected computers, other than a first secure network of interconnected computers to which a connected device is connected to, and enabling the second secure network of interconnected computers to identify the connected device, and (b) unique security credentials enabling only the connected device to connect to the second secure network of interconnected computers and to access at least parts thereof; and sending, by the processing resource, to the connected device, connection information enabling connecting the connected device to the second secure network of interconnected computers, the connection information comprising (a) second identification information enabling identification of the second secure network of interconnected computers, (b) the cloud device identifier; and (c) the unique security credentials.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "sending", "receiving", "establishing", "repeating", "receiving", "disconnecting", "obtaining", "migrating" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIG. 4-7 may be executed. In embodiments of the presently disclosed subject matter one or more stages illustrated in FIG. 4-7 may be executed in a different order and/or one or more groups of stages may be executed simultaneously. FIGS. 1-3 and 8 illustrate a general schematic of the system architecture in accordance with an embodiment of the presently disclosed subject matter. Each module in FIGS. 1-3 and 8 can be made up of any combination of software, hardware and/or firmware that performs the functions as defined and explained herein. The modules in FIGS. 1-3 and 8 may be centralized in one location or dispersed over more than one location. In other embodiments of the presently disclosed subject matter, the system may comprise fewer, more, and/or different modules than those shown in FIGS. 1-3 and 8.

Figure 1:
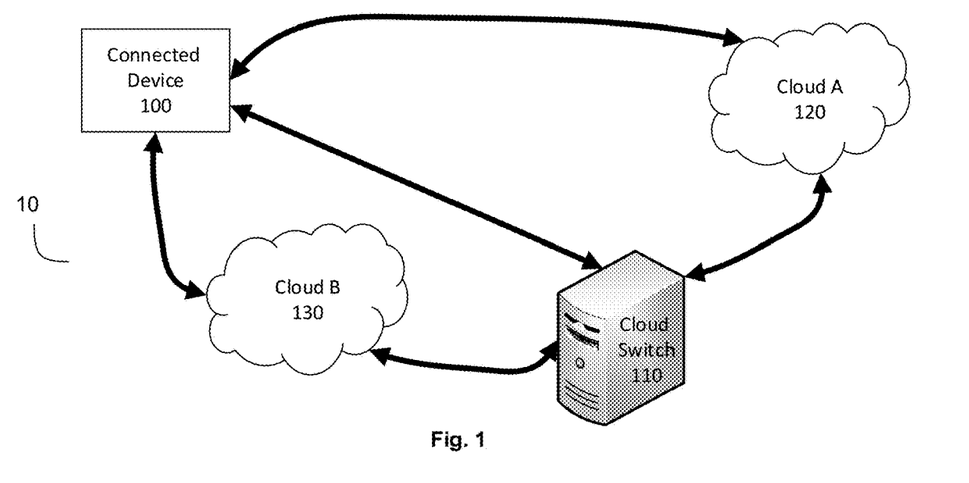
FIGS. 1 and 8 are a schematic illustrations of an environment of a system for configuration of a connected device connection, in accordance with the presently disclosed subject matter.

Bearing this in mind, attention is drawn to FIG. 1, a schematic illustration of an environment of a system for configuration of a connected device connection, in accordance with the presently disclosed subject matter.

According to certain examples of the presently disclosed subject matter, the environment 10 can include at least one connected device 100, at least one cloud switch 110, and at least two distinct secure networks of interconnected computers (a secure network of interconnected computers is also referred to herein as "cloud")—cloud A 120 and cloud B 130. In some cases, a cloud can be a secure network of interconnected computers that requires authentication (e.g. using any authentication mechanism such as a device identifier and a corresponding security token (e.g. password)) of any connected device 100 attempting to connect thereto and/or to communicate therewith, where each such cloud generates (e.g. utilizing one or more computers of the secure network of interconnected computers forming such cloud) at least part of the information used for authenticating any connected device 100 authorized to connect thereto.

A connected device 100 is any device designed to connect to a communication network (e.g. any type of Internet Protocol (IP) based network such as the Internet), and through which to a given cloud. Some examples of connected devices include home appliances, cars, electronic signs, etc. all of which designed to connect to a communication network. Each connected device 100 is designed to send various information obtained thereby to the given cloud, e.g. for storage and/or analysis.

In accordance with the prior art, a connected device 100 includes a firmware pre-configured to connect (optionally automatically) the connected device 100 on which it is installed, via the communication network, to a given pre-defined cloud, such as cloud A 120. Upon activation of such connected device 100, it connects (optionally automatically, or upon a suitable command received from the user) to the communication network (e.g. the Internet) and through such connection it connects to the given pre-defined cloud to which it is pre-configured to connect (e.g. cloud A 120). Remotely configuring such connected device 100 to connect to another cloud (e.g. cloud B 130), is impossible according to the prior art.

As opposed to the prior art (where each connected device 100 includes a firmware pre-configured to connect the connected device 100 on which it is installed to a given pre-defined cloud), the connected device 100 according to the presently disclosed subject matter includes a firmware pre-configured to connect (optionally automatically) the connected device 100 on which it is installed, via the communication network, to a cloud switch 110. The cloud switch 110 can be one or more physical servers and/or a virtual servers capable of connecting to the communication network and capable of communicating with the connected device 100, and with one or more clouds (e.g. cloud A 120, cloud B 130, etc.) therethrough. In some cases, the cloud switch 110 can be part of one of the clouds (e.g. cloud A 120, cloud B 130, etc.). The connected device 100 and the cloud switch 110 are configured to perform a connection process, as further detailed with respect to FIGS. 4 and 6 for establishing a first connection between the connected device 100 and a first cloud (e.g. cloud 120). In addition, upon a command to switch clouds, or upon certain criteria being met, the connected device 100 and the cloud switch 110 are configured to perform a cloud switch process for disconnecting the connected device 100 from the cloud it is connected to (e.g. cloud A 120) and connect it to another cloud, other than the cloud it is connected to (e.g. cloud B 130), as further detailed with respect to FIGS. 5 and 7.

Figure 7:
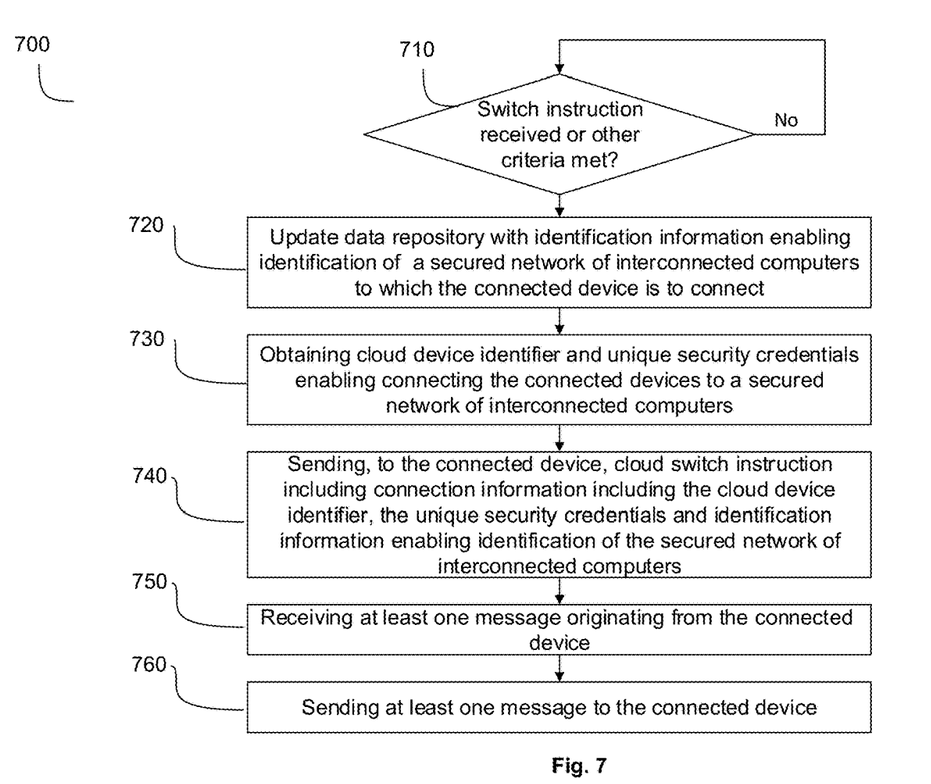
Figure 8:
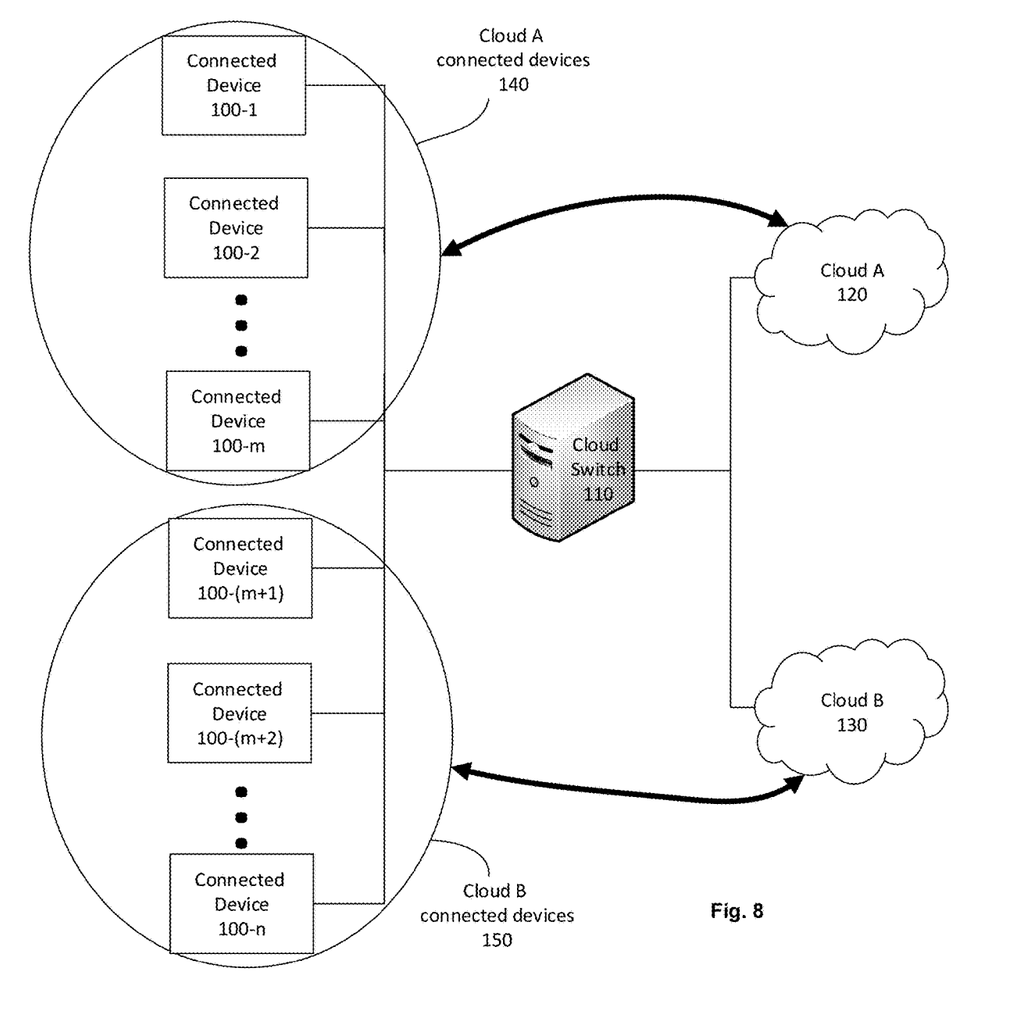

Turning to FIG. 8, it can be appreciated that the environment 10 can comprise a plurality of connected devices 100 (e.g. connected device 100-1, connected device 100-2, . . . , connected device 100-m (m being an integer larger than 2), connected device 100-(m+1), connected device 100-(m+2), connected device 100-n (n being an integer larger than m+2)). In some cases, cloud A connected devices 140 can include connected devices 100-1 to 100-m, all of which connect to cloud A, whereas cloud B connected devices 150 can include connected devices 100-m+1 to 100-n, all of which connect to cloud B 130. The connection of the connected devices 100-1 to 100-n to the respective clouds (cloud A 120 and cloud B 130) can be established in accordance with the connection process detailed herein with respect to FIGS. 4 and 6. In accordance with the presently disclosed subject matter, one or more of the cloud A connected devices 140 and/or one or more of the cloud B connected devices 150, can be configured (optionally remotely, e.g. by the cloud switch 110) to switch clouds for connecting with clouds different than the ones they are connected to, e.g. in accordance with the cloud switch process detailed herein with respect to FIGS. 5 and 7.

In some cases, the instruction to switch clouds can originate from a user (e.g. a manufacturer of a certain group of connected devices 100), e.g. in light of various considerations such as various performance measures relating to the various clouds (e.g. cloud A 120 can have better latency/availability/bandwidth/etc. compared to cloud B 130), costs associated with the connected device 100 connecting to and/or communicating with various clouds (as the cost of a connected device 100 connecting to and/or communicating with a first cloud (e.g. cloud A 120) can be different than the costs of connecting to and/or communicating with a second cloud (e.g. cloud B 130)), security-related offerings of the various clouds (e.g. cloud A 120 can meet various security requirements/standards not met by cloud B 130).

In other cases, the instruction to switch clouds can be initiated by the cloud switch 110, or by the connected device itself, e.g. upon one or more criteria being met. Such criteria can include one or more of the following non-limiting exemplary criteria:

a. one or more performance measures of the cloud to which the connected device is connected to do not meet a corresponding threshold
  b. one or more security requirements are not met by the cloud to which the connected device is connected to;
  c. a cost of the connection to and/or communication with the cloud to which the connected device is connected to is higher than a cost of connection to and/or communication with another cloud;
  d. a current time of day is within a predetermined range (e.g. in cases where the connected device 100 is to connect to different clouds at different times of day;
  e. a current geographical location of the connected device is within a predetermined geographical area (e.g. in cases where the connected device 100 is to connect to different clouds depending on a geographical location thereof, e.g. if the connected device 100 is located in Europe, it can be configured to connect to cloud A 120, whereas if the connected device is located at Australia is can be configured to connect to cloud B 130);
  f. any other criteria, including criteria based on Service Level Agreements (SLAs).

Figure 2:
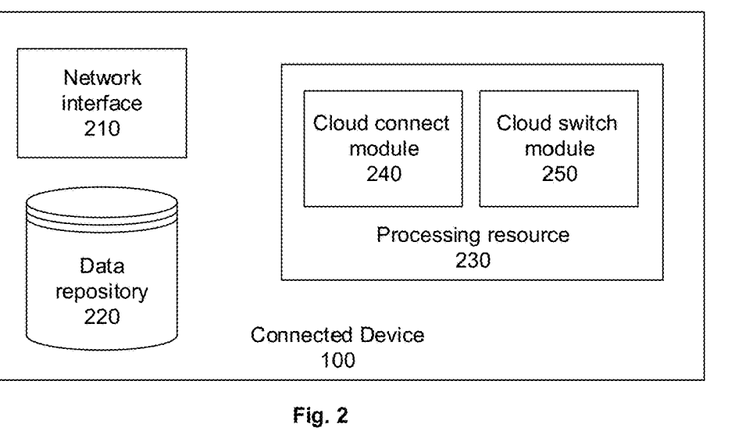
FIG. 2 is a block diagram schematically illustrating one example of a connected device, in accordance with the presently disclosed subject matter.

Having described the environment 10, attention is drawn to FIG. 2, showing a block diagram schematically illustrating one example of a connected device, in accordance with the presently disclosed subject matter.

Figure 4:
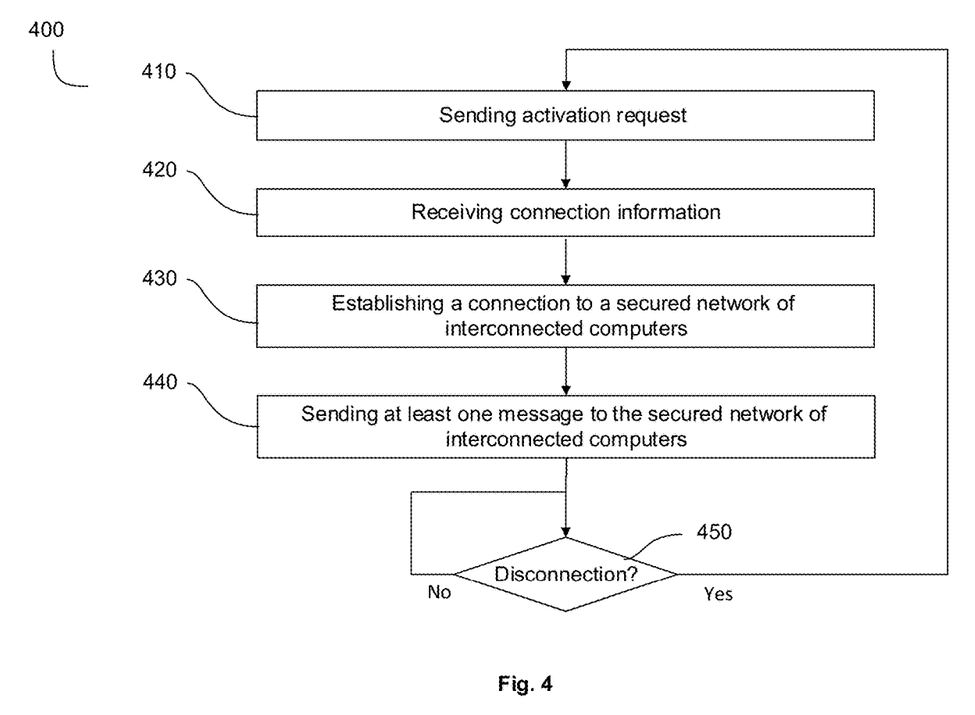
FIGS. 4 and 6 are flowcharts illustrating one example of sequences of operations carried out for connecting a connected device to a network of interconnected computers, in accordance with the presently disclosed subject matter.
Figure 5:
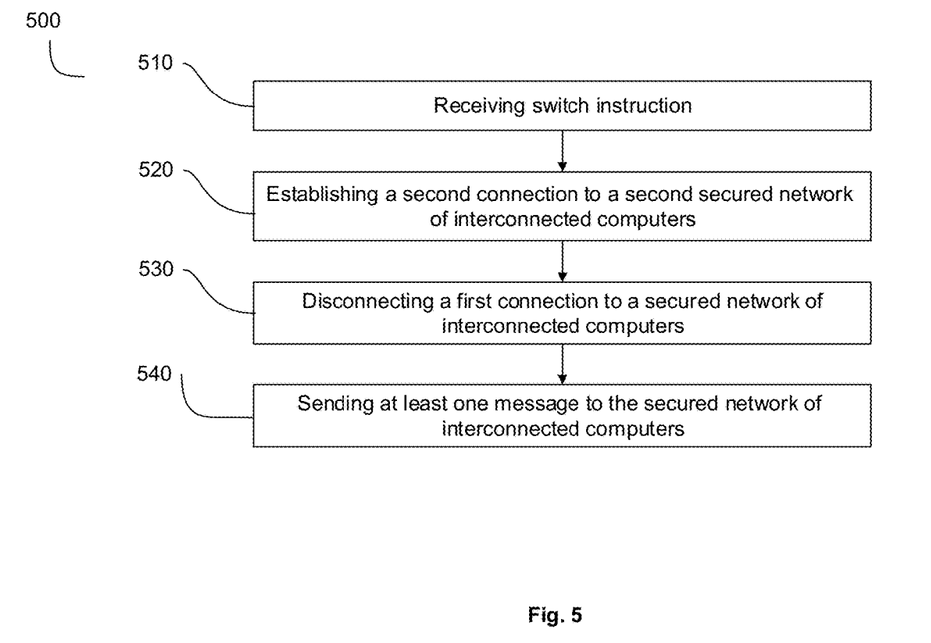
FIGS. 5 and 7 are flowcharts illustrating one example of sequences of operations carried out for reconfiguring a connected device to connect to another network of interconnected computers, in accordance with the presently disclosed subject matter.

According to certain examples of the presently disclosed subject matter, connected device 100 includes a network interface 210, optionally wireless, enabling connecting the connected device 100 to a communication network (e.g. any IP based network such as the Internet) and enabling it to send and receive data sent thereto through the communication network, including sending activation requests, receiving connection information, connecting to and communicating with a given cloud, etc., as further detailed herein, inter alia with reference to FIGS. 4 and 5.

The connected device 100 can further comprise or be otherwise associated with a data repository 220 (e.g. a database, a storage system, a memory including Read Only Memory—ROM, Random Access Memory—RAM, or any other type of memory, etc.) configured to store data, including, inter alia, information identifying the cloud switch 110 (e.g. its IP address), a unique activation key uniquely identifying the connected device 100, etc. In some cases, data repository 220 can be further configured to enable retrieval and/or update and/or deletion of the stored data.

The connected device 100 further comprises a processing resource 230. Processing resource 230 can be one or more processing units (e.g. central processing units), microprocessors, microcontrollers (e.g. microcontroller units (MCUs)) or any other computing devices or modules, including multiple and/or parallel processing units, which are adapted to independently or cooperatively process data for controlling relevant connected device 100 resources and for enabling operations related to connected device 100 resources.

The processing resource 230 can comprise one or more of the following modules: cloud connect module 240 and cloud switch module 250.

According to some examples of the presently disclosed subject matter, the cloud connect module 240 can be configured to perform a connection process for connecting the connected device 100 to a given cloud, as further detailed with respect to FIG. 4.

Cloud switch module 250 can be configured to perform a cloud switch process for connecting the connected device 100 to a cloud other than the given cloud, as further detailed with respect to FIG. 5.

Figure 3:
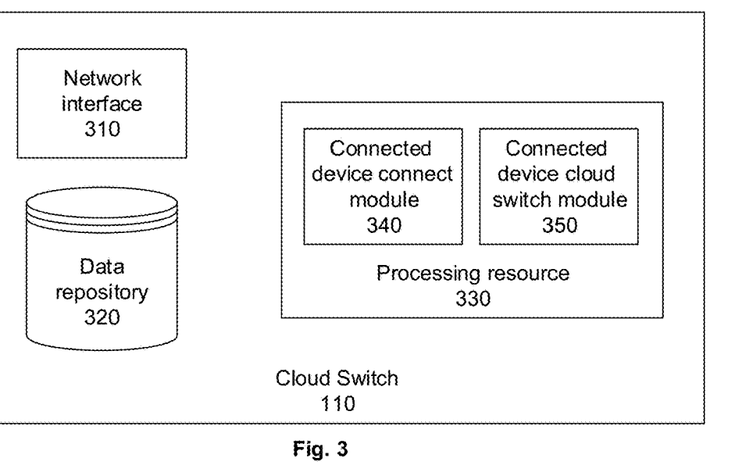
FIG. 3 is a block diagram schematically illustrating one example of a cloud switch, in accordance with the presently disclosed subject matter.

Turning to FIG. 3, there is shown a block diagram schematically illustrating one example of a cloud switch, in accordance with the presently disclosed subject matter.

Figure 6:
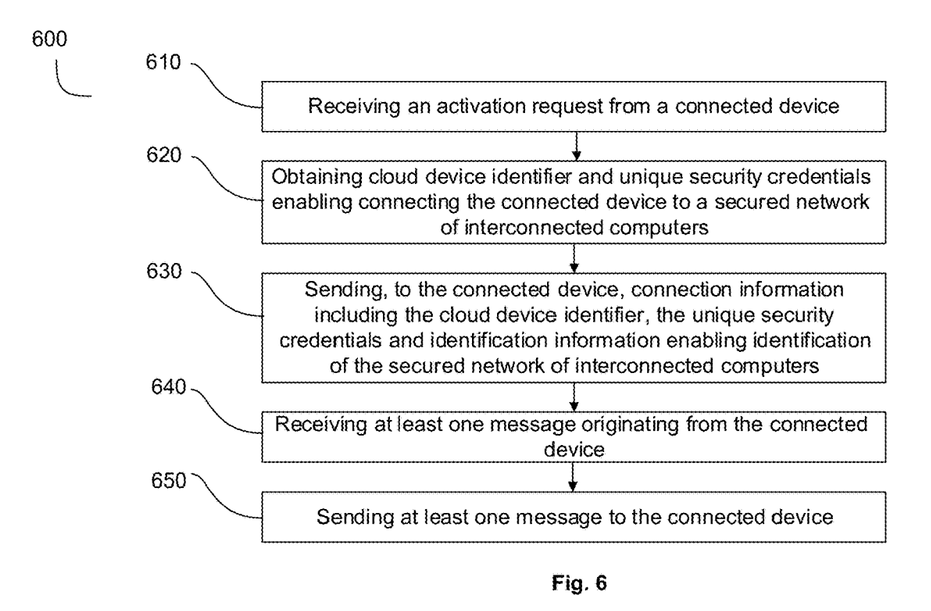

According to certain examples of the presently disclosed subject matter, cloud switch 110 includes a network interface 310, optionally wireless, enabling connecting the cloud switch 110 to a communication network (e.g. any IP based network such as the Internet) and enabling it to send and receive data sent thereto through the communication network, including receiving activation requests, sending connection information, connecting to and communicating with one or more clouds, etc., as further detailed herein, inter alia with reference to FIGS. 6 and 7.

The cloud switch 110 can further comprise or be otherwise associated with a data repository 320 (e.g. a database, a storage system, a memory including Read Only Memory—ROM, Random Access Memory—RAM, or any other type of memory, etc.) configured to store data, including, inter alia, information enabling identification of the connected devices 100, information enabling identification of a cloud to which each connected device 100 is to connect, etc. In some cases, data repository 220 can be further configured to enable retrieval and/or update and/or deletion of the stored data.

The cloud switch 110 further comprises a processing resource 330. Processing resource 330 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant cloud switch 110 resources and for enabling operations related to cloud switch 110 resources.

The processing resource 330 can comprise one or more of the following modules: connected device connect module 340 and connected device switch module 350.

According to some examples of the presently disclosed subject matter, the connected device connect module 340 can be configured to perform a connection process for connecting a connected device 100 to a given cloud, as further detailed with respect to FIG. 6.

Connected device switch module 350 can be configured to perform a cloud switch process for connecting a connected device 100 to a cloud other than a given cloud to which the connected device 100 is connected to, as further detailed with respect to FIG. 7.

Attention is now drawn to FIGS. 4 and 6, showing flowcharts illustrating one example of sequences of operations carried out for connecting a connected device to a network of interconnected computers, in accordance with the presently disclosed subject matter.

According to some examples of the presently disclosed subject matter, connected device 100 and the cloud switch 110 can be configured to execute a cloud connection process 400 and a connected device connection process 600 respectively, for connecting a connected device 100 to a given cloud, e.g. upon establishing a connection (optionally a wireless connection) between the connected device and a communication network. Connected device 100 can execute the cloud connection process 400 utilizing cloud connect module 240. Cloud switch 110 can execute the connected device connect process 600 utilizing the connected device connect module 340.

For this purpose, a given connected device 100 can send, via the communication network, an activation request to the cloud switch 110 (block 410). As indicated above, each connected device 100 can comprise first identification information that can be a 10 unique activation key, or any other unique identifier uniquely identifying the given connected device 100, that can be stored on the connected device's 100 data repository 220. The activation request comprises the unique activation key uniquely identifying the given connected device 100. It is to be noted that the connected device 100 can comprise information that enables it to communicate with the cloud switch 110 (e.g. an IP address of the cloud switch 110, or other information enabling it to send the activation request thereto) via the communication network.

The activation request sent at block 410 is received by the cloud switch 110 (block 610). Upon receipt of an activation request, comprising the activation key uniquely identifying the given connected device 100, the cloud switch 110 obtains a cloud device identifier and unique security credentials enabling connecting the connected device 100 to a given cloud (block 620).

In order to obtain the cloud device identifier and the unique security credentials, the cloud switch 110 can utilize the activation key for obtaining (e.g. by retrieving from data repository 320) information identifying a given cloud to which the given connected device 100 is to connect. Such information can be provided for example by a manufacturer of the given connected device 100 or any entity having permission to decide to which cloud the given connected device 100 is to connect. Additionally, or alternatively, such information can be provided by the cloud switch 110 itself, e.g. as further detailed with respect to FIG. 7. Such information can be stored in the data repository 320 so that each activation key uniquely identifies a corresponding cloud to which the respective connected device 100, associated with the respective activation key, is to connect.

In addition to obtaining the information identifying the given cloud, the cloud switch 110 can be configured to check if the given connected device 100 associated with the activation key has a cloud device identifier previously generated by such given cloud and stored on the data repository 320. If so—the cloud switch 110 also obtains such cloud device identifier and requests the given cloud to generate and provide the unique security credentials for enabling the given connected device 100, associated with the obtained cloud device identifier, to connect to the given cloud. If no cloud device identifier exists for the given connected device 100—the cloud switch 110 requests the given cloud to generate and provide both the cloud device identifier for identifying the given connected device 100 at the given cloud, and the unique security credentials for enabling the given connected device 100 to connect to the given cloud.

If a new cloud device identifier is generated for the given connected device 100, the cloud switch 110 stores the new cloud device identifier in the data repository in association with the given connected device 100 and with given cloud (that generated such cloud device identifier) for future use. It is to be noted that in some cases for each connected device 100 that connects to a given cloud, the given cloud generates information that enables at least storing various information received from such connected device 100 in the given cloud. In some cases, for each connected device 100 that connects to a newly designated cloud, the newly designated cloud allocates storage space for storing data originating from such connected device 100.

Once the cloud device identifier and the unique security credentials associated with the given connected device 100 are obtained at block 620, the cloud switch 110 can send, to the given connected device 100, via the communication network, connection information enabling connecting the given connected device 100 to the given cloud (block 630). The connection information includes the cloud device identifier and the unique security credentials obtained at block 620 and identification information enabling identification of the given cloud to which the given connected device 100 is to connect. The identification information enabling identification of the given cloud to which the given connected device 100 is to connect can include a Uniform Resource Locator (URL) associated with the given cloud (or more specifically with a specific endpoint, such as a computer, a router, a load balancer, etc., that is part of the given cloud) through which the given connected device 100 can connect to the given cloud using the cloud device identifier and the unique security credentials provided thereto. It is to be noted that a URL using Fully Qualified Domain Name (FQDN) is one example of a mechanism that enables secure connection of the given connected device 100 to the given cloud, however other mechanisms (such as using an IP address through which the given connected device 100 can connect to the given cloud) are contemplated as well. It is to be further noted that the identification information enabling identification of the given cloud to which the given connected device 100 is to connect can be retrieved from the data repository 320 as detailed herein (as such information is stored on data repository 320 for each connected device 100).

The connection information sent by the cloud switch at block 630 is received by the given connected device 100 (block 420), which utilizes them for establishing a connection with the given cloud (block 430). Through the established connection, the given connected device 100 sends at least one message to the given cloud, for storage and/or analysis (block 440).

Each message sent by the given connected device 100 to the given cloud is received by the given cloud where they can be stored and/or, analyzed. In some cases, such messages are also forwarded by the given cloud to the cloud switch 110 (and/or to other entities that subscribe to receive such messages from the given cloud) that receives them (block 640) for various purposes. In addition, the cloud switch 110 can optionally send at least one message to the given connected device 100 (block 650). Such messages can be sent by the cloud switch 110 to the given connected device 100 directly (e.g. according to the Message Queuing Telemetry Transport (MQTT) standard or by Representational State Transfer (REST) messages), or via the connection established at block 430 (utilizing the cloud device identifier identifying the given connected device 100 at the given cloud). The messages sent by the cloud switch 110 to the given connected device 100 can be control messages designed to cause the given connected device to perform various operations (e.g. remote reset, request logs, firmware update, setting one or more parameters, requesting values of one or more parameters, etc.).

The given connected device 100 can be further configured to monitor if the connection to the given cloud was disconnected (block 450). Such monitoring can be performed by continuously or periodically (e.g. every pre-determined time interval, whenever an attempt is made to send a message at block 440, etc.). If a disconnection is identified, the cloud connection process 400 and the connected device connection process 600 can repeat for re-establishing the connection.

One exemplary reason for a disconnection is usage of temporary unique security credentials. In such cases, the unique security credentials generated by the given cloud for the given connected device 100 are valid for a limited period of time, after which they expire and do not enable connection of the given connected device 100 to the given cloud. In such cases, the given connected device 100 is required to obtain new unique security credentials, other than the previously used unique security credentials obtained at block 620, upon expiry of the previously generated unique security credentials that are no longer valid.

Another exemplary reason for a disconnection is when a cloud switch is performed during which the given cloud is instructed to disconnect the given connected device 100 therefrom. In such case, upon repeating the cloud connection process 400 and the connected device connection process 600, the identification information enables identification of a second cloud, other than the given cloud, to which the given connected device 100 is to connect. In addition, the cloud device identifier and the unique security credentials obtained at block 620 are be generated by the second cloud. As a result, the connection established at block 430 in such case, is between the given connected device 100 and the second cloud.

It is to be noted that, with reference to FIGS. 4 and 6, some of the blocks can be integrated into a consolidated block or can be broken down to a few blocks and/or other blocks may be added. Furthermore, in some cases, the blocks can be performed in a different order than described herein (for example, block 650 can be performed before block 640, block 450 can be performed before block 440). It is to be further noted that some of the blocks are optional. It should be also noted that whilst the flow diagram is described also with reference to the system elements that realizes them, this is by no means binding, and the blocks can be performed by elements other than those described herein.

Turning to FIGS. 5 and 7, there are shown flowcharts illustrating one example of sequences of operations carried out for reconfiguring a connected device to connect to another network of interconnected computers, in accordance with the presently disclosed subject matter.

According to some examples of the presently disclosed subject matter, connected device 100 and the cloud switch 110 can be configured to execute a cloud switch process 400 and a connected device cloud switch process 600 respectively, for connecting a given connected device 100 to a cloud other than a cloud to which it is connected. Connected device 100 can execute the cloud switch process 400 utilizing cloud switch module 250. Cloud switch 110 can execute the connected device cloud switch process 600 utilizing the connected device cloud switch module 350.

For this purpose, cloud switch 110 can be configured to check if a switch instruction is received (e.g. from a user such as a manufacturer of a certain group of connected devices 100 comprising the given connected device 100) or if other criteria is met (block 710). The check can be performed continuously or periodically (e.g. every predetermined time interval and/or whenever an activation request is received at block 610, etc.).

In some cases, the criteria can include one or more of the following (non-limiting):
a. one or more performance measures (e.g. latency/availability/bandwidth, etc.) of the cloud to which the given connected device 100 is connected to do not meet a corresponding threshold;
b. one or more security requirements (e.g. various security standard requirements relating to communication, storage, Disaster Recovery (DR), etc.) are not met by the cloud to which the given connected device 100 is connected to;
c. a first cost of the connection of the given connected device to the cloud to which it is connected to is higher than a cost of a connection of the given connected device to another cloud, other than the cloud to which it is connected to (e.g. based on analysis of average usage of the connected device 100 over a given period of time such as a day/week/month/etc.);
d. a current time of day is within a predetermined range (e.g. in cases where the connected device 100 is to be connected to a first cloud during a certain part of the day (e.g. 8:00-20:00) and to a second cloud during another part of the day (e.g. 20:00-8:00), for example due to cost considerations, different usage requirements during the different parts of day, etc.);
e. a current geographical location of the given connected device 100 is within a predetermined geographical area (e.g. upon initial installation thereof or due to a geographical location change so that the given connected device 100 is now within the predetermined geographical area, other than another geographical area in which it was previously located). For example, when the connected device 100 is located in Europe, there may be a requirement that it connects to a cloud whose servers are located in Europe, whereas in other cases it can connect to other clouds that are not located in Europe, that can be cheaper and/or have better performance, etc.; and
f. any other criteria, including criteria based on Service Level Agreements (SLAs).

It is to be noted that the switch instruction includes identification information enabling identification of a newly designated cloud, other than the cloud to which the given connected device 100 is connected to, to which the given connected device 100 is to connect. In a similar manner, if switching clouds is due to one or more of the criteria being met, the cloud switch 110 can determine, according to the criteria being met, identification information enabling identification of the newly designated cloud.

If a switch instruction is received, or the other criteria is met, cloud switch 110 can be configured to update the data repository 320 with identification information enabling identification of the newly designated cloud (block 720).

In some cases, the process can end here, so that when the given connected device 100 identifies a disconnection at block 450 a new activation request will be sent 20 thereby to the cloud switch 110, this time leading to connecting the given connected device 100 to the newly designated cloud.

However, in other cases, switching clouds can be performed proactively. In such cases, the cloud switch 110 can be configured to obtain a cloud device identifier and unique security credentials enabling connecting the connected device 100 to the newly designated cloud (block 730). For this purpose, the cloud switch 110 can be configured to check if the given connected device 100 has a cloud device identifier previously generated by the newly designated cloud in the past stored on the data repository 320. If so—the cloud switch 110 obtains such cloud device identifier and requests the newly designated cloud to generate and provide the unique security credentials for enabling 30 the given connected device 100 to connect to thereto. If no cloud device identifier exists for the given connected device 100— the cloud switch 110 requests the newly designated cloud to generate and provide both the cloud device identifier for identifying the given connected device 100 at the newly designated cloud, and the unique security credentials for enabling the given connected device 100 to connect to the newly designated cloud.

If a new cloud device identifier is generated for the given connected device 100, the cloud switch 110 stores the new cloud device identifier in the data repository in association with the given connected device 100 and with newly designated cloud (that generated such cloud device identifier) for future use. It is to be noted that in some cases for each connected device 100 that connects to a newly designated cloud, the newly designated cloud generates information that enables at least storing various information received from such connected device 100 in the newly designated cloud. In some cases, for each connected device 100 that connects to a newly designated cloud, the newly designated cloud allocates storage space for storing data originating from such connected device 100.

Once the cloud device identifier and the unique security credentials associated with the given connected device 100 are obtained at block 730, the cloud switch 110 can send, to the given connected device 100, via the communication network, connection information enabling connecting the given connected device 100 to the newly designated cloud (block 740). The connection information includes the cloud device identifier and the unique security credentials obtained at block 730 and identification information enabling identification of the newly designated cloud to which the given connected device 100 is to connect. The identification information enabling identification of the newly designated cloud to which the given connected device 100 is to connect can include a Uniform Resource Locator (URL) associated with the newly designated cloud (or more specifically with a specific endpoint, such as a computer, a router, a load balancer, etc., that is part of the newly designated cloud) through which the given connected device 100 can connect to the newly designated cloud using the cloud device identifier and the unique security credentials provided thereto. It is to be noted that a URL using Fully Qualified Domain Name (FQDN) is one example of a mechanism that enables secure connection of the given connected device 100 to the given cloud, however other mechanisms (such as using an IP address through which the given connected device 100 can connect to the given cloud) are contemplated as well.

The connection information sent by the cloud switch at block 740 is received by the given connected device 100 as part of a cloud switch instruction (block 510), where they are utilized for establishing a connection with the newly designated cloud (block 520). In addition to establishing the connection with the newly designated cloud, the given connected device 100 can be configured to disconnect the connection with the cloud to which it was previously connected (block 530).

Through the established connection, the given connected device 100 can send at least one message to the newly designated cloud, for storage and/or analysis (block 540).

Each message sent by the given connected device 100 to the newly designated cloud is received by the newly designated cloud where they can be stored and/or analyzed. In some cases, such messages are also forwarded by the newly designated cloud to the cloud switch 110 that receives them (block 750) for various purposes. In addition, the cloud switch 110 can optionally send at least one message to the given connected device 100 (block 760). Such messages can be sent by the cloud switch 110 to the given connected device 100 directly (e.g. according to the Message Queuing Telemetry Transport (MQTT) standard), or via the connection established at block 520 (utilizing the cloud device identifier identifying the given connected device 100 at the newly designated cloud). The messages sent by the cloud switch 110 to the given connected device 100 can be control messages designed to cause the given connected device to perform various operations (e.g. remote reset, request logs, firmware update, setting one or more parameters, requesting values of one or more parameters, etc.)

It is to be noted that in some cases, the cloud switch 110, can be configured to initiate migration of the data relating to the given connected device 100 stored on the cloud to which the given connected device 100 was connected before disconnecting the connection at block 530, to the newly designated cloud. In that case, the cloud switch 110 can utilize the security credentials of the given connected device 100 to access the given connected device's historical data in the cloud to which it was connected, read it, and write it to the newly designated cloud.

It is to be further noted that the given connected device 100 can be configured to monitor disconnections and perform any action derived from such disconnections being identified as detailed herein with reference to FIG. 4, also after establishing the connection to the newly designated cloud, thereby maintaining a connection between the given connected device 100 and the newly designated cloud.

It is to be still further noted that a switch command can be received by the cloud switch 110 for a group of two or more connected devices 100 simultaneously. For example, a given manufacturer of a group of connected devices 100 can request all such connected devices 100, or a sub-group thereof, to switch clouds.

It is to be further noted that, with reference to FIGS. 5 and 7, some of the blocks can be integrated into a consolidated block or can be broken down to a few blocks and/or other blocks may be added. Furthermore, in some cases, the blocks can be performed in a different order than described herein (for example, block 530 can be performed before block 520, block 750 can be performed before block 740). It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A method for switching a connection of a connected device from a first connection to a first secure network of interconnected computers to a second connection to a second secure network of interconnected computers, the method comprising:

obtaining, by a processing resource of a cloud switch server, (a) a cloud device identifier generated by the second secure network of interconnected computers and enabling the second secure network of interconnected computers to identify the connected device, and (b) unique security credentials enabling only the connected device to connect to the second secure network of interconnected computers and to access at least parts thereof; and sending, by the processing resource, to the connected device, connection information enabling connecting the connected device to the second secure network of interconnected computers, the connection information comprising (a) second identification information enabling identification of the second secure network of interconnected computers, (b) the cloud device identifier; and (c) the unique security credentials;

wherein the obtaining and sending are performed after receiving, by the processing resource of the cloud switch server, from a user, a switch instruction for switching the connection of the connected device from the first connection to the first secure network of interconnected computers to the second connection to the second secure network of interconnected computers.

2. The method of claim 1 wherein the obtaining and sending are performed upon one or more criteria being met.

3. The method of claim 2 wherein the criteria includes one or more of the following:
   a. one or more performance measures of the first secure network of interconnected computers do not meet a corresponding threshold;
   b. one or more security requirements are not met by the first secure network of interconnected computers;
   c. a first cost of the first connection is higher than a second cost of the second connection;
   d. a current time of day is within a predetermined range; and
   e. a current geographical location of the connected device is within a predetermined geographical area.

4. The method of claim 1 further comprising receiving, by the cloud switch server, from the second secure network of interconnected computers, at least one message sent by the connected device to the second secure network of interconnected computers.

5. The method of claim 1 further comprising sending, by the cloud switch server, at least one message to the connected device via the second secure network of interconnected computers, utilizing the cloud device identifier.

6. The method of claim 1 wherein the cloud switch server is not part of the first secure network of interconnected computers and of the second secure network of interconnected computers.

7. The method of claim 1 wherein the first connection is disconnected after the second connection is established.

8. The method of claim 1 further comprising migrating past data associated with the connected device and stored on the first secure network of interconnected computers to the second secure network of interconnected computers after the second connection is established.

9. A cloud switch server comprising a processing resource, the processing resource configured to:
   obtain (a) a cloud device identifier generated by a second secure network of interconnected computers, other than a first secure network of interconnected computers to which a connected device is connected to, and enabling the second secure network of interconnected computers to identify the connected device, and (b) unique security credentials enabling only the connected device to connect to the second secure network of interconnected computers and to access at least parts thereof; and
   send, to the connected device, connection information enabling connecting the connected device to the second secure network of interconnected computers, the connection information comprising (a) second identification information enabling identification of the second secure network of interconnected computers, (b) the cloud device identifier; and (c) the unique security credentials;
   wherein the obtain and send are performed after receiving, by the processing resource, from a user, a switch instruction for switching a connection of the connected device from a first connection to the first secure network of interconnected computers to a second connection to the second secure network of interconnected computers.

10. The cloud switch server of claim 9, wherein the obtain and send are performed upon one or more criteria being met.

11. The cloud switch server of claim 10 wherein the criteria includes one or more of the following:
   a. one or more performance measures of the first secure network of interconnected computers do not meet a corresponding threshold;
   b. one or more security requirements are not met by the first secure network of interconnected computers;
   c. a first cost of the first connection is higher than a second cost of the second connection;
   d. a current time of day is within a predetermined range; and
   e. a current geographical location of the connected device is within a predetermined geographical area.

12. The cloud switch server of claim 9 wherein the processing resource is further configured to receive, from the second secure network of interconnected computers, at least one message sent by the connected device to the second secure network of interconnected computers.

13. The cloud switch server of claim 9 wherein the processing resource is further configured to send at least one message to the connected device via the second secure network of interconnected computers, utilizing the cloud device identifier.

14. The cloud switch server of claim 9 wherein the cloud switch server is not part of the first secure network of interconnected computers and of the second secure network of interconnected computers.

15. The cloud switch server of claim 9 wherein the first connection is disconnected after the second connection is established.

16. The cloud switch server of claim 9 wherein the processing resource is further configured to migrate past data associated with the connected device and stored on the first secure network of interconnected computers to the second secure network of interconnected computers after the second connection is established.

17. A non-transitory computer readable storage medium having computer readable program code embodied therewith, the computer readable program code, executable by at least one processor of a computer to perform a method comprising:
   obtaining, by a processing resource of a cloud switch server, (a) a cloud device identifier generated by a second secure network of interconnected computers, other than a first secure network of interconnected computers to which a connected device is connected to, and enabling the second secure network of interconnected computers to identify the connected device, and (b) unique security credentials enabling only the connected device to connect to the second secure network of interconnected computers and to access at least parts thereof; and
   sending, by the processing resource, to the connected device, connection information enabling connecting the connected device to the second secure network of interconnected computers, the connection information comprising (a) second identification information enabling identification of the second secure network of interconnected computers, (b) the cloud device identifier; and (c) the unique security credentials;
   wherein the obtain and send are performed after receiving, by the processing resource, from a user, a switch instruction for switching a connection of the connected device from a first connection to the first secure network of interconnected computers to a second connection to the second secure network of interconnected computers.

* * * * *